June 16, 1959    R. M. CAMPBELL    2,890,511
QUICK-CHANGE CABLE CLAMP
Filed May 22, 1953
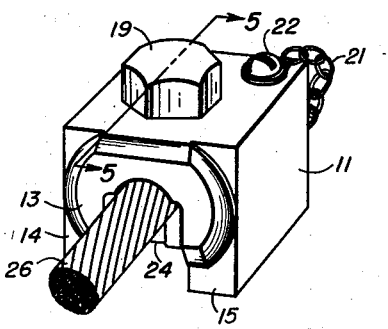
Fig. 1.
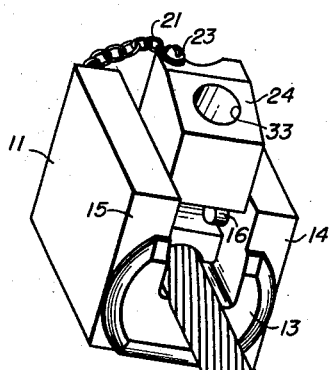
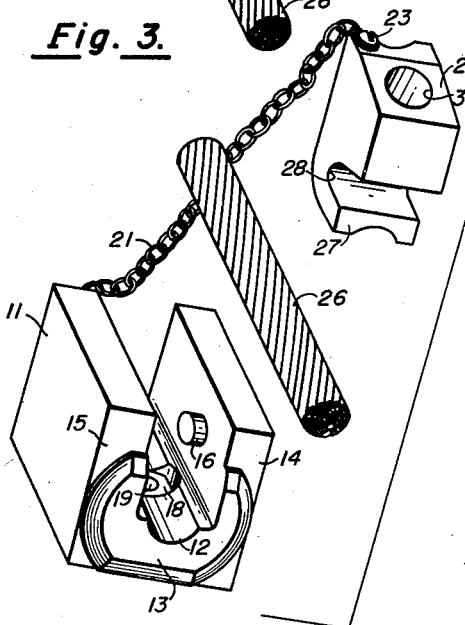
Fig. 3.
Fig. 2.
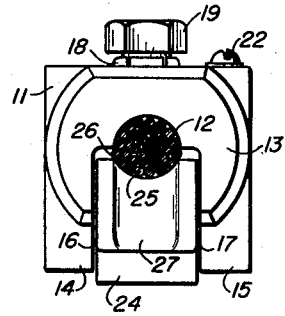
Fig. 4.
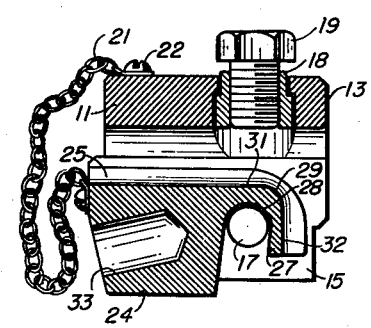
Fig. 5.
INVENTOR.
ROBYN M. CAMPBELL
BY George Sipkin
George E. Pearson
ATTORNEYS United States Patent Office
2,890,511
Patented June 16, 1959

2,890,511

QUICK-CHANGE CABLE CLAMP

Robyn M. Campbell, San Diego, Calif.

Application May 22, 1953, Serial No. 356,916

3 Claims. (Cl. 24—134)

(Granted under Title 35, U.S. Code (1952), sec. 266)

The invention described herein may be manufactured and used by or for the Government of the United States of America for governmental purposes without the payment of any royalties thereon or therefor.

This invention relates to a clamp and more particularly to a quick change clamp which can be secured to an intermediate portion of a cable and is particularly adapted to serve as a stop member.

Various clamping devices have been proposed for connecting a plurality of cables, particularly to form an electrical connection, but these devices have been complicated and expensive to construct, required involved manipulation for assembly, and in many cases required the rotation of a threaded member to provide the necessary clamping engagement. Many of these devices were designed and inherently restricted to use with two conductors or cables and were not adapted for use as a stop member on a single cable.

The clamp of the present invention is adapted to clamp readily and quickly on a single cable with a minimum of time and effort and securely engage the cable with a tight gripping action so that it will serve to prevent the cable from moving beyond a certain point where the clamp engages a stop member or will support a device such as a measuring instrument adapted to be lowered by the cable without slippage. The device may, however, be used for clamping two cables together and is provided with a threaded adjusting element to provide for slight variations in the diameter of the cable such as those which may occur due to stretching of the cable during use.

In one preferred embodiment of the present invention two complementary elements are secured to each other by a safety chain to prevent separation. One of the elements is provided with a longitudinal groove of semicircular cross section formed on a radius substantially the same as the cable on which the device is adapted to be clamped, and is also provided at one end with a boss or projection which is adapted to support the apparatus suspended on the cable or receive the force exerted against the clamp when used as a stop member. This outer element is also provided with a pair of lugs which provide a pivotal connection for the other complementary element which has a transverse recess for engaging the lugs and a longitudinal groove for engaging the underside of the cable. A lip on the outer end of this inner element slips between the lugs and the cable, and, when the inner element is rotated by a handle inserted in a suitable recess, it is forced into clamping engagement with the under side of the cable. A screw threaded member extends through a threaded aperture into the cable groove of the outer element and may be adjusted to compensate for slight variations in the diameter of the cable which may occur through stretching or other causes.

One object of the present invention is to provide a simple and economical clamp which is readily and securely engageable with one or more cables with a minimum of time and effort involved in the application of the device to the cable.

Another object of the invention is to provide a cable clamp adapted to securely engage a single cable at an intermediate point thereof and serve as a stop member for supporting a relatively heavy weight or withstanding a strong force without slippage.

Other objects and many of the attendant advantages of this invention will be readily appreciated as the same becomes better understood by reference to the following detailed description when considered in connection with the accompanying drawings wherein:

Fig. 1 is a pictorial view illustrating one preferred embodiment of the present invention in position on a single cable;

Fig. 2 is an exploded pictorial view showing the elements of the device illustrated in Fig. 1 in position to be attached to a cable;

Fig. 3 is a pictorial view showing the elements assembled prior to clamping;

Fig. 4 is an end view of the device shown in Fig. 1; and

Fig. 5 is a sectional view through the device shown in Fig. 1 taken on line 5—5 of Fig. 1.

Referring now to the drawings in detail, the outer element 11 is provided with a longitudinal semi-circular recess or groove 12 which is substantially the same diameter as the original diameter of the cable with which the clamping device is adapted to be used.

One end of the outer element 11 is provided with a projection or boss 13 which is adapted to receive the force or thrust applied to the stop member by abutting the apparatus suspended on the cable or by abutting a suitable projection provided to prevent movement of the cable beyond a particular point. The projection or boss 13 is extended on both sides of the center line of the cable so that no eccentric force will be exerted on the clamp which would tend to disengage it from the cable.

The outer element 11 is provided with substantially parallel lateral flanges 14 and 15 which have aligned circular lugs or pins 16 and 17 for a purpose to be described infra.

A stop nut 18 is pressed into a suitable recess in the outer element 11 and provides a threaded aperture into which the adjustable cap screw 19 extends. It will be obvious that other means such as a lock nut may be utilized to retain the cap screw 19 securely in any adjusted position.

A chain 21 or other suitable means is secured to the outer element by a cap screw 22 and is also secured by means of a cap screw 23 to the inner element 24 to prevent the two parts from becoming separated during the manipulation of the device.

The inner element 24 is also provided with a longitudinal arcuate recess or groove 25 which is complementary to the semi-circular recess 12 in the outer element 11 and serves to engage the opposite side of the cable 26. The inner element 24, which fits between the flanges 14 and 15 with a slight clearance to permit free movement therebetween, is provided with a lip or hook-shaped portion 27 forming a recess with a semi-circular journal portion 28 which engages and pivots on the lugs or pins 16 and 17.

It will be apparent from a careful inspection of the section of lip 27, Fig. 5, that the thickness of the lip increases gradually from the outer portion thereof back towards the body of the inner element 24. The section decreases slightly at the point directly above the pin 17 to provide a locking or binding action which will tend to prevent the inner element 24 from releasing due to the slight bending of the cable. This result is preferably attained by forming the nose portion 29 on an arc about an eccentric center of curvature with the straight portions 31 and 32 tangent thereto. However, the nose portion 29 could be formed on an arc about the same center of curvature as the arcuate journal portion 28 or by using a portion of a helical curve to connect the straight portions 31 and 32. The critical relationship is to have the perpendicular distance from the center of curvature of the arcuate journal portion 28 to the straight portion 32 less than the perpendicular distance to the straight portion 31, and the latter distance being less than the radial distance from the center of curvature of the arcuate portion 28 to the nose 29.

A socket 33 is formed in the inner element 24 which is adapted to receive the end portion 34 of a combined tool and handle 35 which is utilized for manipulating the inner element 24 in moving it into clamping engagement with the other side of the cable 26. A gripping portion 36 is knurled to facilitate rotation of the tool when utilizing the socket end 37 to rotate the adjusting screw 19 when the cable is slightly reduced in diameter with respect to its original size, and, if desired, a cross bar handle 38 may be provided for additional torque, when necessary.

Operation

In the operation of the device the outer element 11 is placed over one side of the cable and the lip 27 of the inner element 24 is inserted between the cable and the pins 16 and 17 in the manner illustrated in Figs. 2 and 3. The reduced end portion 34 of the tool 35 is inserted in the bore or socket 33 and the inner element 24 is rotated to the position shown in Fig. 5 wherein it is securely engaging the cable in clamping engagement therewith.

If desired, the construction of the inner element 24 could be modified in a manner not illustrated by making the element solid and providing a complete circular bore transversely therethrough in place of the recess with the arcuate journal portion 28. With this construction the outer element 11 would also be bored transversely and a single removable pin extending through the bores would be used in place of two separate pins 16 and 17. However, this construction would not be capable of the rapid manipulation and use possible with the preferred embodiment shown in the drawings herein.

It will be apparent that by changing the shapes of the complementary grooves 12 and 25, the device of the present invention can be readily constructed in such a manner that it can be utilized for clamping two cables together and with this type of construction could be used as an electrical connector particularly for clamping one electrical cable to an intermediate portion of a second electrical cable, where it is impossible or impractical to slip a conventional connector over the ends of the two cables.

Obviously many modifications and variations of the present invention are possible in the light of the above teachings. It is therefore to be understood that within the scope of the appended claims the invention may be practiced otherwise than as specifically described.

I claim:

1. A cable clamp comprising a U-shaped outer element having a longitudinal groove, said outer element having a pair of lateral flanges with pins extending inwardly therefrom and spaced a distance greater than the diameter of the cable, an inner element having straight and hook-shaped portions the hook-shaped portion comprising an end portion and a nose portion and said portions having a longitudinal groove, said hook-shaped portion being adapted to engage and journal on said pins, the outer end of said hook-shaped portion having a thickness substantially less than the intermediate nose portion of said hook-shaped portion and slightly less than the straight portion.

2. A cable clamp as set forth in claim 1 wherein said outer element has a projection on one end face thereof, said projection having a substantially flat face perpendicular to the axis of said grooves and partially encircling said grooves.

3. A cable clamp as set forth in claim 1 wherein a stop nut is mounted in the intermediate section of said outer element opposite said pin, and an adjusting screw suitably engaging said nut and extending into said groove to compensate for variations in the diameter of the cable between said grooves.

References Cited in the file of this patent

UNITED STATES PATENTS

| 300,797 | Post | June 24, 1884 |
| 588,903 | Gillen | Aug. 24, 1897 |
| 809,726 | Nelson | Jan. 9, 1906 |
| 1,044,717 | Wiberg | Nov. 19, 1912 |
| 1,080,472 | Parker | Dec. 2, 1913 |
| 1,226,221 | Keator | May 15, 1917 |
| 1,258,580 | Lassister | Mar. 5, 1918 |
| 1,783,256 | Miller | Dec. 2, 1930 |
| 2,124,485 | Dellenbach | July 19, 1938 |

FOREIGN PATENTS

| 6,217 | Great Britain | Mar. 16, 1909 |
| 169,881 | Germany | July 28, 1905 |